United States Patent
Moon et al.

(10) Patent No.: US 7,500,154 B2
(45) Date of Patent: Mar. 3, 2009

(54) METHOD AND SYSTEM FOR GENERATING A CONSOLE LOG

(75) Inventors: Billy G. Moon, Cary, NC (US); Marco Molteni, Antibes (FR); Mark Schnell, Mebane, NC (US)

(73) Assignee: Cisco Technology, Inc., San Jose, CA (US)

( * ) Notice: Subject to any disclaimer, the term of this patent is extended or adjusted under 35 U.S.C. 154(b) by 557 days.

(21) Appl. No.: 11/016,094

(22) Filed: Dec. 17, 2004

(65) Prior Publication Data

US 2006/0143529 A1    Jun. 29, 2006

(51) Int. Cl.
*G06F 11/00* (2006.01)
(52) U.S. Cl. .......................................................... 714/57
(58) Field of Classification Search ................... 714/57, 714/51, 47
See application file for complete search history.

(56) References Cited

U.S. PATENT DOCUMENTS

| | | | | |
|---|---|---|---|---|
| 5,047,977 A | * | 9/1991 | Hill et al. ..................... | 714/57 |
| 6,654,915 B1 | * | 11/2003 | Lu et al. ....................... | 714/57 |
| 7,046,213 B2 | * | 5/2006 | Campbell et al. ............ | 345/2.2 |
| 7,111,206 B1 | * | 9/2006 | Shafer et al. ................. | 714/48 |
| 7,213,176 B2 | * | 5/2007 | Banko .......................... | 714/38 |
| 2003/0079007 A1 | * | 4/2003 | Merkin ........................ | 709/223 |
| 2005/0010545 A1 | * | 1/2005 | Joseph ......................... | 707/1 |

OTHER PUBLICATIONS

Cisco Systems, "SFR System Functional Specification" (Paper Document), Copyright © 2004, 34 pages.

* cited by examiner

*Primary Examiner*—Nadeem Iqbal
(74) *Attorney, Agent, or Firm*—Trellis IP Law Group, PC

(57) ABSTRACT

A method and system are provided for generating a console log of a device (e.g., a router). During the powering on of the device, certain information may have to be written to the console log. If the information to be written is critical, the console log is generated. In case the information is non-critical, the system checks whether a console device is connected to the device. If a console device is connected to the device, the information is written to the console log. Otherwise, if there is no console device connected to the device, the information is not written to the console log.

29 Claims, 4 Drawing Sheets

METHOD AND SYSTEM FOR GENERATING A CONSOLE LOG

BACKGROUND OF THE INVENTION

1. Field of Invention

This invention relates in general to the boot time associated with a device. More specifically, the invention relates to methods and systems for generating the console log of a device.

2. Description of the Background Art

Hardware devices, such as routers, have the provision to access diagnostic information pertaining to the device. Apart from diagnostic information, console logs for copyright and agreement notices may also be generated by means of this provision. The diagnostic information may be generated or provided during powering on of a device, after powering on the device, or if the device sends a special message during its normal functioning. The diagnostic information is made accessible to a user by generating a console log. The device provides a console port through which the diagnostic information may be transmitted to generate the console log. The console port may consist of a Universal Asynchronous Receiver Transmitter (UART). The UART may be interrupt-driven or poll-driven. It may also contain First In First Out (FIFO) memory, which allows for more than one byte to be queued for transmission. The UART may also have associated control signals that allow the detection of a data terminal or a modem. It may support synchronous or asynchronous calls. Synchronous calls are usually used for printing critical information. However, in such a system, the powering on time of the device is increased substantially, since the information is sent to the console log during the powering on. Also, all the processes are blocked till the critical information has been written or printed to the console log. Typically, a console log printout causes a delay of a minimum of 60 milliseconds and a maximum of 700 milliseconds. Thus, critical information after booting, or any information (i.e., critical or otherwise) during booting, may be written or printed using polling in a synchronous fashion; that is, all process(es) in the platform are blocked until critical information has been written or printed to a console port. This is necessary to guarantee that any message is in fact printed during failure cases. However, this assumes that there is "listener" for the information.

What is needed is an apparatus and method for optimizing a console log by by-passing synchronous (blocking) writing or printing to the console log when no "listener" is present. What is further needed is an apparatus and method for altering or changing the behavior of a print process to a console log, and to not stop processing other tasks, after detecting that no "listener" is present.

SUMMARY OF THE EMBODIMENTS OF THE INVENTION

In one embodiment, the invention provides a method for generating a console log of a device when the device is powered on. The console log is generated in response to a request from the device to write information to the console log. The method comprises the steps of (i) checking whether the information is critical, and (ii) writing the information to the console log if it is critical. If the information is not critical, the method comprises checking for the presence of a console device attached to a console port, and by-passing writing information to the console log if the console device is not detected. Therefore, an embodiment of the present invention provides a method comprising: (i) checking whether the information is critical, (ii) writing the information to the console log if it is critical; else (iii) checking for the presence of a console device attached to a console port, and (iv) by-passing writing the information to the console log if the console device is not detected.

In another embodiment of the invention, a method for generating a console log of a device is provided. The method comprises (i) writing critical information to the console log during the powering on of the device, (ii) writing non-critical information to the console log during the powering on of the device if a console device is attached to a console port of the device, (iii) checking whether the device has a message to display once it is powered on, and (iv) writing the message to the console log if the console device is detected.

In another embodiment, the invention provides a method for generating a console log of a device when the device is powered on. The console log is generated in response to a request from the device to write information to the console log. The method comprises (i) checking for the presence of a console device attached to a console port, (ii) by-passing writing the information to the console log if the console device is not detected, and (iii) writing the information to the console log if the console device is detected.

In another embodiment, the invention provides a system for generating a console log of a device when the device is powered on. The device sends a request to write information to the console log. The system comprises (i) means for checking whether the information is critical, (ii) means for writing the information to the console log, and (iii) means for checking for the presence of a console device attached to a console port. The information is not written to the console log if the console device is not detected.

In another embodiment, the invention provides a system for generating a console log of a router. The system comprises (i) an information writer for writing information to the console log, (ii) a console checker for checking whether a console device is connected to a console port of the device, wherein the information is not written to the console log if the console device is not detected, (iii) and a message checker for checking whether the device has a message to write to the console log once it is powered on.

These provisions, together with various ancillary provisions and features that will become apparent to artisans skilled in the art, as the following description proceeds, are achieved by means of devices, assemblies, systems, and methods of embodiments of the present invention, various embodiments thereof being shown with reference to the accompanying drawings, by way of example only, wherein:

DETAILED DESCRIPTION OF THE EMBODIMENTS OF THE INVENTION

The invention provides a method and system to generate a console log for devices, such as routers. During the powering on of the device, diagnostic information relating to the device may be written to a console log. Also, after the powering on, the device may send a message that is to be written to the console log. In various embodiments of the invention, the diagnostic information may be printed by means of a console device. It is to be noted that the process of writing to the console device is hereinafter referred to as printing.

Figure 1:
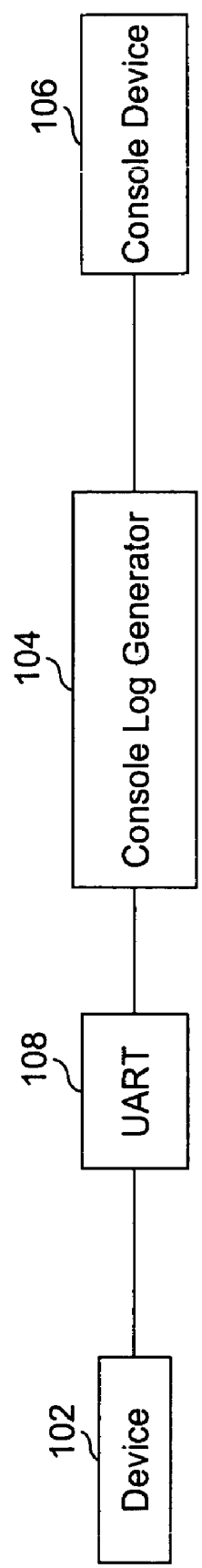
FIG. 1 illustrates a schematic diagram of the environment wherein a console log generator can be implemented, in accordance with an exemplary embodiment of the present invention.

FIG. 1 illustrates a schematic diagram of the environment wherein a system for generating a console log can be implemented, in accordance with an exemplary embodiment of the present invention. The environment comprises a device 102, a console log generator 104, a console device 106, and a UART 108. Device 102 may be a router in various embodiments. It sends information to be written to a console log. The information may be diagnostic information, copyright notices or agreement notices in various embodiments of the invention. In an embodiment of the invention, the information may be classified as either critical or non-critical. Examples of critical information include fatal errors and crash stack traces or security alert. An example fatal error might be a memory fault, which would prevent the platform from booting. A crash trace might happen when a process attempts to address improper memory (software logic error) in which case a calling stack with pointers to code segments is printed so that the defect may be traced. An example of a security alert would be when the system configuration is changed or attempted to be changed. Console log generator 104 sends the information to be written in to the console log only if console device 106 is connected to a console port of device 102. Additionally, in various embodiments of the invention, console log generator 104 checks whether the information is critical or non-critical, and accordingly, sends the information to be written to console device 106. In another embodiment, UART 108 may be connected to console port of device 102. The receive data pin of UART 108 may be connected to console log generator 104. UART 102 uses console log generator to determine whether console device 106 is connected to device 102. If console device 106 is detected, a log is generated. Console device 106 may be a printer, a display device, a modem to provide remote access to the platform, a terminal server that aggregates the output of several co-located routers into a single device or a monitor that reads the console logs and takes other action such as reconfiguring the system or sounding an alarm. In one embodiment, console log generator 104 is a part of device 102.

Figure 2:
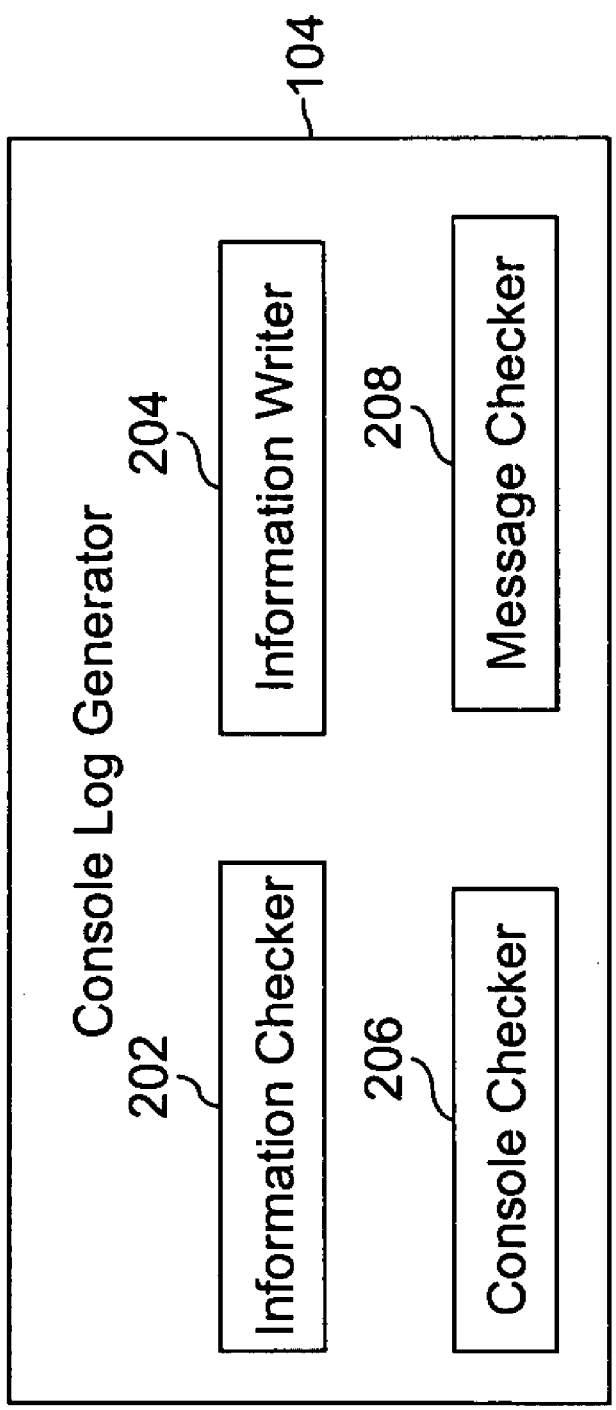
FIG. 2 illustrates a schematic diagram of a console log generator, in accordance with an exemplary embodiment of the invention.

FIG. 2 illustrates a schematic diagram of console log generator 104, in accordance with an embodiment of the invention. Console log generator 104 includes an information checker 202, an information writer 204, a console checker 206, and a message checker 208.

During the powering on, device 102 sends information that is to be written to the console log. This information may be sent in the form of data packets, each packet comprising various fields, such as a field that indicates the criticality of the information. In an embodiment, the packet may be a log-d packet. In another embodiment, the information may be sent via an application program interface (API) by an internal application. Information checker 202 checks whether the information sent by device 102 is critical or non-critical. If the information is critical, information writer 204 writes the information to the console log. If the information is non-critical, console checker 206 checks whether console device 106 is connected to a console port. In an embodiment of the invention, information checker 202 reads the data packets sent by device 102 and checks the appropriate tag of the packet, to identify whether the information is critical or not.

The console port is a part of device 102 and enables connection with console device 106. The console port includes a UART. The UART may be interrupt-driven or poll-driven.

Console checker 206 identifies the presence of console device 106 connected to device 102 by measuring the 'idle voltage' on a receive data pin of the console port. In one embodiment, when a console device is attached to the console port, the 'idle voltage' is a low reference voltage, for example, 12 V or less. In one embodiment, idle voltage is anything less than −3 volts on the device's receive data pin. The receive data pin is the pin through which the router receives data. When console device 106 is attached to the console, it is required to pull the receive data pin to −12 volts to indicate an RS232 idle condition. Console checker 206 therefore can detect when console device 106 is attached. If console device 106 is connected, then information writer 204 writes the information to the console log. In an embodiment of the invention, console checker 206 may be a comparator circuit that compares the voltage at the receive data pin of the console port with the low reference voltage. In another embodiment, devices (e.g., device 102) check whether console device 106 is sending a start bit. A start bit indicates a busy state. Either of busy or idle state indicates the presence of console device 106. Also, neither busy nor idle state indicates the absence of console device 106. In another embodiment, a timer condition may be applied during the busy state. If a signal indicates busy state for more than a given time period, then it is implied that a functioning console device 106 is not attached. The time period is typically greater than ten byte times.

Further, once device 102 is powered on, it may send a message to be written to the console log. Subsequently, message checker 208 checks whether device 102 has sent a message. In various embodiments, this check is periodically performed. In an embodiment of the present invention, message checker 208 periodically sends a polling message to device 102, to check for the information to be written to the console log. In another embodiment of the present invention, message checker 208 waits for a signal from device 102. The signal indicates the presence of information to be written into the console log.

Each of the elements of console log generator 104 can be implemented on a chip as a part of, for example, an application-specific integrated circuit and field-programmable gate arrays. Further, some of the elements of console log generator 104, for example information checker 202 can be implemented as software modules or as a combination of hardware and software modules.

Figure 3:
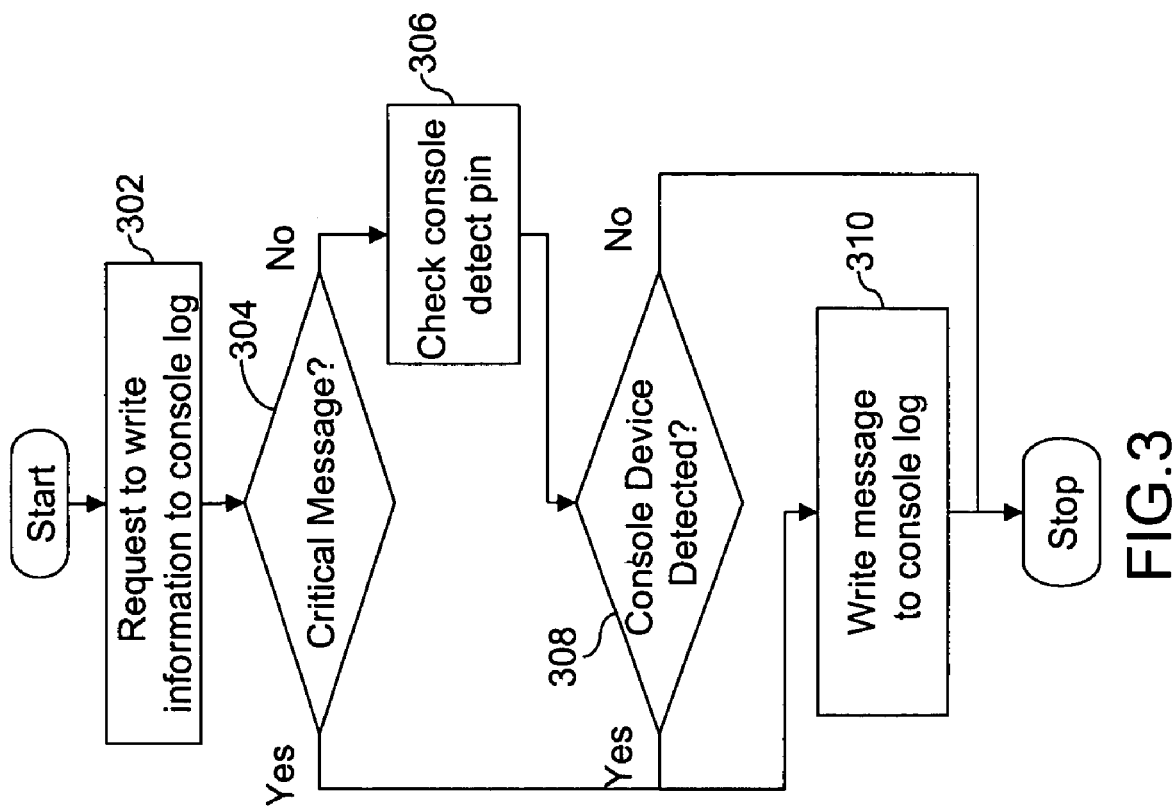
FIG. 3 illustrates a flow diagram describing a method for generating a console log during the powering on of a device, in accordance with an exemplary embodiment of the invention.

FIG. 3 illustrates a flow diagram describing a method to generate the console log after a request to write the information to the console log is made, in accordance with an exemplary embodiment of the invention. At step 302, device 102 sends a request to write the information to the console log. At step 304, information checker 202 checks whether the information or the message is critical or non-critical. If the information is non-critical, console checker 206 checks the 'idle voltage' at the receive data pin at step 306. Based on the 'idle voltage', a check is carried out to identify whether a console device is connected, as shown in step 308. If a console device is connected, the information is written to the console log, as shown in step 310. If the console device is not connected, the information is not written to the console log. If it is identified at step 304 that the information is critical, then the information is directly written to the console log, as shown in step 310.

Figure 4:
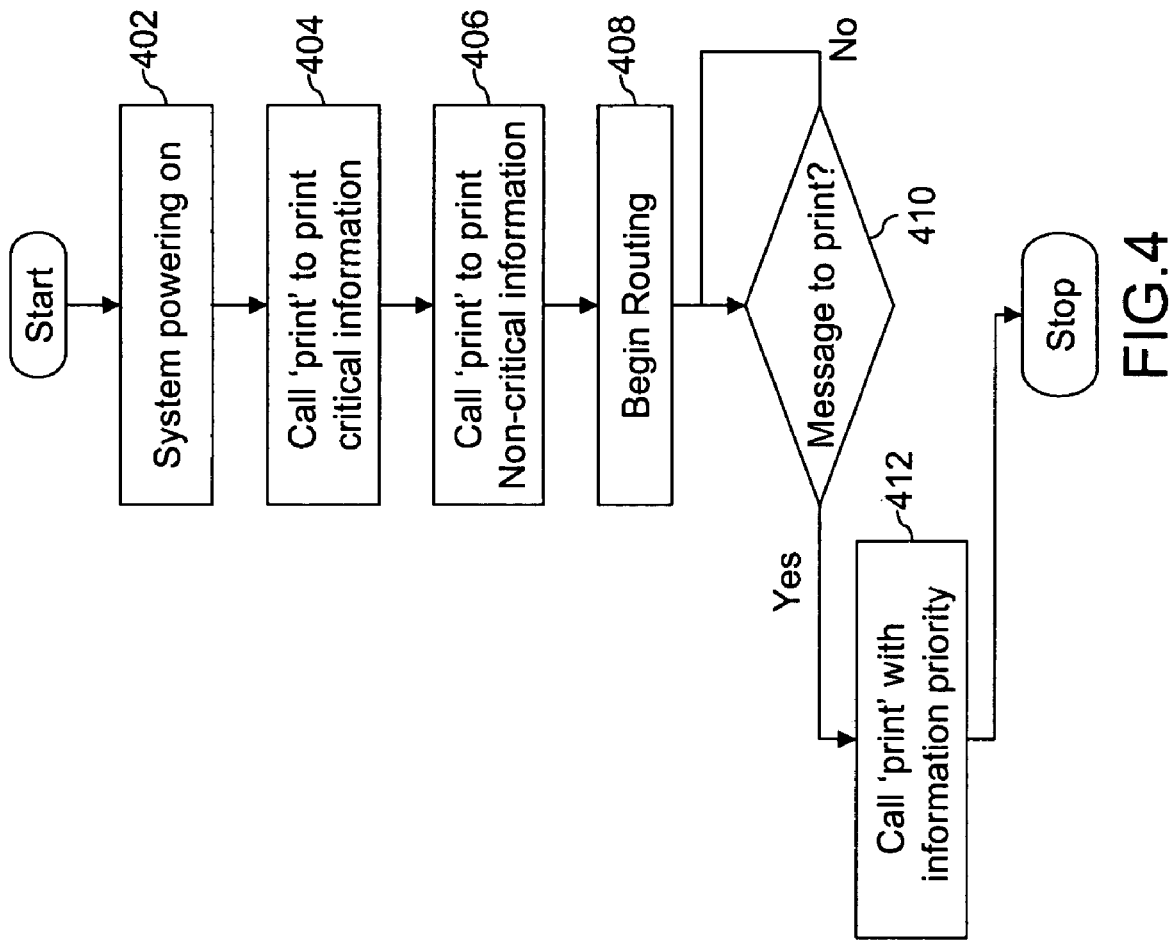
FIG. 4 illustrates a flow diagram describing the method for generating the console log after a request to write the information to the console log has been given, in accordance with an exemplary embodiment of the invention.

FIG. 4 illustrates a flow diagram describing the method for generating the console log during the powering on of a device, in accordance with an exemplary embodiment of the invention. Booting or powering on of the device takes place, as shown in step 402. During the powering on, device 102 sends a request to write the critical and non-critical information to the console log, as shown in steps 404 and 406, respectively. Once the request to write the information to the console log is made, the steps described in conjunction with FIG. 3 are followed. Subsequently, after the device has been powered on, for example, when 'buginfo' is to be written, or the synchronous output is to be specified in a command line interface of the router, message checker 208 periodically checks device 102 for new messages, as shown in step 408. If it is identified at step 410 that device 102 has a message that needs to be written to the console log, then device 102 may send a request to write the message, along with an information priority. The information priority decides whether the information is critical or non-critical. Subsequently, the message is written into the console log, if the console device is present at step 412, by following steps described in conjunction with FIG. 3.

Embodiments of the present invention have the advantage that the powering on time of device 102 is reduced. Another advantage is that device 102 does not use resources to write information to be written to the console device, unless the console device is actually connected.

Although the invention has been discussed with respect to specific embodiments thereof, these embodiments are merely illustrative and not restrictive of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of the embodiments of the present invention. One skilled in the relevant art will recognize, however, that an embodiment of the invention can be practiced without one or more of the specific details, or with other apparatuses, systems, assemblies, methods, components, materials, parts, and/or the like. In other instances, well-known structures, materials or operations are not specifically shown or described in detail, to avoid obscuring aspects of the embodiments of the present invention.

Reference throughout this specification to "one embodiment", "an embodiment", or "a specific embodiment" means that a particular feature, structure or characteristic described in connection with the embodiment is included in at least one embodiment of the present invention, and not necessarily in all embodiments. Therefore, the appearances of the phrases "in one embodiment", "in an embodiment", or "in a specific embodiment" in various places throughout this specification do not necessarily refer to the same embodiment. Furthermore, the particular features, structures or characteristics of any specific embodiment of the present invention may be combined in any suitable manner with one or more other embodiments. It is to be understood that other variations and modifications of the embodiments of the present invention, described and illustrated herein, are possible in light of the teachings herein and are to be considered as part of the spirit and scope of the present invention.

Further, at least some of the components of an embodiment of the invention may be implemented by using a programmed general-purpose digital computer, by means of application-specific integrated circuits, programmable logic devices, field-programmable gate arrays, or by using a network of interconnected components and circuits. Connections may be wired, wireless, by modem, and so forth.

It will also be appreciated that one or more of the elements depicted in the drawings/figures can also be implemented either in a separate or integrated manner, or even removed or rendered inoperable in certain cases, as is useful, in accordance with a particular application.

Additionally, any signal arrows in the drawings/figures should be considered only as exemplary, and not limiting, unless otherwise specifically mentioned. Combinations of components or steps will also be considered as being noted, where the terminology renders the ability to separate or combine as unclear.

As used in the description herein and throughout the claims that follow, 'a', 'an', and 'the' includes plural references, unless the context clearly dictates otherwise. Also, as used in the description herein and throughout the claims that follow, the meaning of 'in' includes 'in' as well as 'on', unless the context clearly dictates otherwise.

The foregoing description of the illustrated embodiments of the present invention, including what is described in the abstract, is not intended to be exhaustive or limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of the illustrated embodiments of the present invention, and are to be included within the spirit and scope of the present invention.

Therefore, while the present invention has been described herein with reference to particular embodiments thereof, latitude of modification and various changes and substitutions are intended in the foregoing disclosures. It will be appreciated that in some instances some features of the embodiments of the invention will be employed without the corresponding use of other features, without departing from the scope and spirit of the invention, as set forth. Therefore, many modifications may be made, to adapt a particular situation or material to the essential scope and spirit of the present invention. It is intended that the invention is not limited to the particular terms used in the following claims, and/or to the particular embodiment disclosed, as the best mode contemplated for carrying out this invention. The invention will include any and all embodiments and equivalents falling within the scope of the appended claims.

What is claimed is:

1. A method for generating a console log of a device when the device is powered on, the device sending a request to write information to the console log, the method comprising:
   checking whether the information is critical;
   writing the information to the console log if it is critical;
   checking for the presence of the console device attached to a console port to determine if the console device is able to receive the information for the console log; and
   by-passing writing the information to the console log if the console device is not detected such that the by-passing of writing of the information to the console log does not block performing of one or more processes to be performed during powering on of the device.

2. The method according to claim 1 further comprises writing the information to the console log if the console device is detected.

3. The method according to claim 1, wherein the console port comprises a Universal Asynchronous Receiver Transmitter (UART).

4. The method according to claim 3, wherein the UART is poll-driven or interrupt driven.

5. The method according to claim 1, wherein the presence of the console device is detected by measuring the idle voltage at the console port.

6. The method according to claim 5, wherein the user console device is connected to the console port if the idle voltage is a low reference voltage.

7. The method according to claim 1, wherein the device is a router.

8. A method for generating a console log of a device, the method comprising:
   writing critical information to the console log during the powering on of the device;
   writing non-critical information to the console log during the powering on of the device if a console device is attached to a console port of the device;
   by-passing writing the non-critical information to the console log if the console device is not detected such that the by-passing of writing of the information to the console log does not block performing of one or more processes to be performed during powering on of the device;
   checking whether the device has a message to display once it is powered on; and
   writing the message to the console log if the console device is detected.

9. The method according to claim 8, wherein the console port comprises a UART.

10. The method according to claim 9, wherein the UART is interrupt driven or poll-driven.

11. The method according to claim 8, wherein presence of the console device is detected by measuring the idle voltage at the console port.

12. The method according to claim 11, wherein the console device is connected to the console port if the idle voltage is a low reference voltage.

13. The method according to claim 8, wherein the device is a router.

14. The method according to claim 8, wherein the checking for the message is performed periodically.

15. A method for generating a console log of a device, the device sending a request to write information to the console log, the method comprising:
    detecting the presence of a console device attached to a console port of the device;
    by-passing writing the information to the console log if the console device is not detected such that the by-passing of writing of the information to the console log does not block performing of one or more processes to be performed during powering on of the device; and
    writing the information to the console log if the console device is detected.

16. A system for generating a console log of a device when the device is powered on, the device sending a request to write information to the console log, the system comprising:
    means for checking whether the information is critical;
    means for writing the information to the console log; and
    means for checking for the presence of a console device attached to a console port, wherein the information is not written to the console log if the console device is not detected such that not writing of the information to the console log does not block performing of one or more processes to be performed during powering on of the device.

17. The system according to claim 16, wherein the console port comprises a UART.

18. The system according to claim 16, wherein the means for checking for the presence of the console device measures the idle voltage at the console port.

19. The system according to claim 18, wherein the console device is connected to the console port if the idle voltage is a low reference voltage.

20. A system for generating a console log of a router comprising:
    an information writer for writing information to the console log;
    an information checker for checking whether information is critical or non-critical;
    a console checker for checking whether a console device is connected to a console port of the device, wherein the information is not written to the console log if the console device is not detected such that not writing of the information to the console log does not block performing of one or more processes to be performed during powering on of the device; and
    a message checker for checking whether the device has a message to write to the console log once it is powered on.

21. The system according to claim 20, wherein the console port comprises a UART.

22. The system according to claim 21, wherein the UART is interrupt driven or poll-driven.

23. The system according to claim 20, wherein the presence of the console device is detected by measuring the idle voltage at the console port.

24. The system according to claim 20, wherein the message checker performs the check periodically.

25. An apparatus for generating a console log of a router comprising:
    a processing system including a processor coupled to a display and user input device;
    a machine-readable medium including instructions executable by the processor comprising
    one or more instructions for checking whether the information is critical;
    one or more instructions for writing the information to the console log; and one or more instructions for checking for the presence of a console device attached to a console port, wherein the information is not written to the console log if the console device is not detected such that the writing of the information to the console log does not block performing of one or more processes to be performed during powering on of the device.

26. A machine-readable medium including instructions executable by the processor comprising:
one or more instructions for checking whether the information is critical;
one or more instructions for writing the information to the console log; and
one or more instructions for checking for the presence of a console device attached to a console port, wherein the information is not written to the console log if the console device is not detected such that the writing of the information to the console log does not block performing of one or more processes to be performed during powering on of the device.

27. The method of claim 1, wherein writing of the information to the log comprises a synchronous operation that blocks other operations from being performed during powering on of the device.

28. The method of claim 8, wherein writing of the information to the log comprises a synchronous operation that blocks other operations from being performed during powering on of the device.

29. The system of claim 20, wherein writing of the information to the log comprises a synchronous operation that blocks other operations from being performed during powering on of the device.

* * * * *